United States Patent
Soriaga et al.

(10) Patent No.: US 11,523,412 B2
(45) Date of Patent: Dec. 6, 2022

(54) UE PROCESSING TIME FOR UCI MULTIPLEXING

(71) Applicant: QUALCOMM Incorporated, San Diego, CA (US)

(72) Inventors: Joseph Binamira Soriaga, San Diego, CA (US); Hari Sankar, San Diego, CA (US); Amir Aminzadeh Gohari, Sunnyvale, CA (US); Afshin Shiravi, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/192,669

(22) Filed: Nov. 15, 2018

(65) Prior Publication Data
US 2019/0159231 A1 May 23, 2019

Related U.S. Application Data

(60) Provisional application No. 62/588,275, filed on Nov. 17, 2017.

(51) Int. Cl.
*H04W 72/12* (2009.01)
*H04L 5/00* (2006.01)
(Continued)

(52) U.S. Cl.
CPC ....... *H04W 72/1268* (2013.01); *H04L 1/0693* (2013.01); *H04L 1/1671* (2013.01);
(Continued)

(58) Field of Classification Search
CPC ......... H04W 72/1268; H04W 72/1247; H04W 72/0413; H04W 72/0446; H04L 5/0057;
(Continued)

(56) References Cited

U.S. PATENT DOCUMENTS

| | | | |
|---|---|---|---|
| 9,100,155 B2 | 8/2015 | Luo et al. | |
| 2010/0113057 A1* | 5/2010 | Englund | H04W 72/14 455/452.1 |

(Continued)

FOREIGN PATENT DOCUMENTS

| | | |
|---|---|---|
| CN | 102845038 A | 12/2012 |
| JP | 2016526322 A | 9/2016 |
| WO | 2011140109 A1 | 11/2011 |

OTHER PUBLICATIONS

Huawei et al., "Discussion on Uplink Control Channel Design in NR", 3GPP Draft; R1-1608840, 3rd Generation Partnership Project (3GPP), Mobile Competence Centre ; 650, Route Des Lucioles ; F-06921 Sophia-Antipolis Cedex ; France, vol. RAN WG1, No. Lisbon, Portugal; Oct. 10, 2016-Oct. 14, 2016, Oct. 9, 2016 (Oct. 9, 2016), XP051148894, 3 Pages, Retrieved from the Internet:URL:http://www.3gpp.org/ftp/Meetings_3GPP_SYNC/RAN1/Docs/ [retrieved on Oct. 9, 2016], Section 2.

(Continued)

*Primary Examiner* — Ivan O Latorre
*Assistant Examiner* — Malick A Sohrab
(74) *Attorney, Agent, or Firm* — Qualcomm Incorporated

(57) ABSTRACT

Various additional and alternative aspects are described herein. In some aspects, the present disclosure provides techniques for determining timing conditions for uplink control information (UCI) processing by a user equipment (UE).

29 Claims, 11 Drawing Sheets

(51) Int. Cl.
  *H04L 1/06* (2006.01)
  *H04L 1/16* (2006.01)
  *H04L 25/02* (2006.01)

(52) U.S. Cl.
  CPC .......... *H04L 5/0055* (2013.01); *H04L 5/0057* (2013.01); *H04L 25/0226* (2013.01); *H04W 72/1247* (2013.01); *H04L 5/005* (2013.01); *H04L 5/0007* (2013.01)

(58) Field of Classification Search
  CPC . H04L 25/0226; H04L 5/0055; H04L 1/1671; H04L 1/0693; H04L 5/005; H04L 5/0007; H04L 5/0053
  See application file for complete search history.

(56) References Cited

U.S. PATENT DOCUMENTS

| | | | |
|---|---|---|---|
| 2011/0141928 A1 | 6/2011 | Shin et al. | |
| 2011/0310986 A1* | 12/2011 | Heo | H04W 72/0413 375/259 |
| 2015/0334685 A1* | 11/2015 | Ji | H04W 72/1231 370/330 |
| 2016/0309460 A1* | 10/2016 | Heo | H04W 72/0413 |
| 2017/0026992 A1* | 1/2017 | Jiang | H04L 5/1469 |
| 2017/0094545 A1* | 3/2017 | Subrahmanya | H04L 1/0027 |
| 2019/0098608 A1* | 3/2019 | Yi | H04L 5/0064 |
| 2019/0342769 A1* | 11/2019 | Li | H04W 8/245 |
| 2019/0363832 A1* | 11/2019 | Yang | H04L 1/18 |
| 2020/0037314 A1* | 1/2020 | Xiong | H04L 5/0091 |
| 2020/0205228 A1* | 6/2020 | Takeda | H04L 5/0057 |
| 2020/0213994 A1* | 7/2020 | Feng | H04L 5/0044 |
| 2020/0367244 A1* | 11/2020 | Yang | H04L 1/1861 |

OTHER PUBLICATIONS

International Search Report and Written Opinion—PCT/US2018/061516—ISA/EPO—dated May 14, 2019.
LG Electronics: "Structure of Control and Data Multiplexing for NR", 3GPP Draft; R1-1609276 NR CH Multplexing_Final, 3rd Generation Partnership Project (3GPP), Mobile Competence Centre ; 650, Route Des Lucioles ; F-06921 Sophia-Antipolis Cedex; France, vol. RAN WG1, No. Lisbon, Portugal; Oct. 10, 2016-Oct. 14, 2016, Oct. 9, 2016 (Oct. 9, 2016), XP051149322, 3 Pages, Retrieved from the Internet: URL:http://www.3gpp.org/ftp/Meetings_3GPP_SYNC/RAN1/Docs/ [retrieved on Oct. 9, 2016], Section 2.
Panasonic: "Discussion on UCI Multiplexing with Different Use Cases", 3GPP Draft; R1-1713352, 3rd Generation Partnership Project (3GPP), Mobile Competence Centre; 650, Route Des Lucioles; F-06921 Sophia-Antipolis Cedex; France , vol. RAN WG1, No. Prague, Czechia; Aug. 21, 2017-Aug. 25, 2017, Aug. 20, 2017 (Aug. 20, 2017), XP051316156, Retrieved from the Internet:URL:http://www.3gpp.org/ftp/Meetings_3GPP_SYNC/RAN1/Docs/ [retrieved on Aug. 20, 2017], Section 2.
Taiwan Search Report—TW107140777—TIPO—dated Jan. 12, 2022.
Taiwan Search Report—TW107140777—TIPO—dated Apr. 27, 2022.

* cited by examiner

| Assumptions | N1 | N2 |
|---|---|---|
| Nominal | Single carrier / Single BWP / Single TRP<br>○ Full range of MCS and multi-layer support up to 4-layer MIMO and 256-QAM<br>○ Up to 3,300 active subcarriers<br>PDCCH<br>○ Same numerology / BWP as PDSCH<br>○ Single grant monitored for PDSCH<br>○ 44 blind decodes, single symbol CORESET<br>PDSCH<br>○ PDSCH does not precede PDCCH<br>○ 14-symbol slot-based scheduling<br>○ Frequency-first RE-mapping, no time-interleaving of CBs across TB<br>PUCCH<br>○ Short formats for HARQ-ACK | Single carrier / Single BWP / Single TRP<br>○ Full range of MCS and multi-layer support up to the 2-layer MIMO and 64-QAM<br>○ Up to 3,300 active subcarriers<br>PDCCH<br>○ Same numerology / BWP as PUSCH<br>○ Single grant monitored for PUSCH<br>○ 44 blind decoding, single symbol CORESET<br>PUSCH<br>○ 14-symbol slot-based scheduling<br>○ No time-interleaving of CBs across TB<br>○ DFT-S-OFDM or OFDM<br>○ Front loaded DMRS for low latency<br>○ No UCI multiplexing |
| Candidate | ○ SCS<br>○ DMRS configuration<br>○ [Percentage of peak rate]<br>○ [RE-mapping] | ○ SCS<br>○ RE-mapping (depending on specification)<br>○ [Percentage of peak rate] |

FIG. 7

| DMRS for CE | HARQ Timing Parameter | Units | 15 kHz SCS | 30 kHz SCS | 60 kHz SCS | 120 kHz SCS |
|---|---|---|---|---|---|---|
| Front-loaded DMRS only | N1 | Symbols | [8] | [10] | [14] | [14-21] |
| Front-loaded + additional DMRS | N1 | Symbols | [13] | [13] | [17] | [21] |
| Frequency First | N2 | Symbols | [9] | [11] | [17] | [31] |

FIG. 7A

| DMRS for CE | HARQ Timing Parameter | Units | 15 kHz SCS | 30 kHz SCS |
|---|---|---|---|---|
| Front-loaded DMRS only | N1 | Symbols | [2.5-4] | [2.5-6] |
| Front-loaded + additional DMRS | N1 | Symbols | [12] | [12] |
| Frequency First | N2 | Symbols | [2.5-6] | [2.5-6] |

FIG. 7B

UE PROCESSING TIME FOR UCI MULTIPLEXING

CLAIM OF PRIORITY UNDER 35 U.S.C. § 119

This application claims the benefit of U.S. Provisional Patent Application Ser. No. 62/588,275, filed Nov. 17, 2017, which is herein incorporated by reference in its entirety.

TECHNICAL FIELD

Certain aspects of the present disclosure generally relate to wireless communications and, more particularly, to techniques for processing uplink control information (UCI) in wireless communication systems.

INTRODUCTION

Wireless communication networks are widely deployed to provide various communication services such as telephony, video, data, messaging, broadcasts, and so on. Such networks, which are usually multiple access networks, support communication for multiple users by sharing the available network resources. Within such wireless networks a variety of data services may be provided, including voice, video, and emails. The spectrum allocated to such wireless communication networks can include licensed spectrum and/or unlicensed spectrum. As the demand for mobile broadband access continues to increase, research and development continue to advance wireless communication technologies not only to meet the growing demand for mobile broadband access, but also to advance and enhance the user experience with mobile communications.

Technologies to support wireless networks have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Certain aspects of the present disclosure provide a method for wireless communications by a user equipment (UE). The method generally includes determining if conditions applied to time delays for separate requests for at least two types of information are satisfied and sending an uplink transmission which multiplexes the two types of information if each of the conditions is satisfied In some aspects, the present disclosure provides a method, apparatus, system, computer program product, and processing system as substantially described herein with reference to and as illustrated by the accompanying drawings.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 7 illustrates example UE processing time dependency factors according to some aspects of the present disclosure FIGS. 7A & 7B illustrate example UE processing time capabilities according to some aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
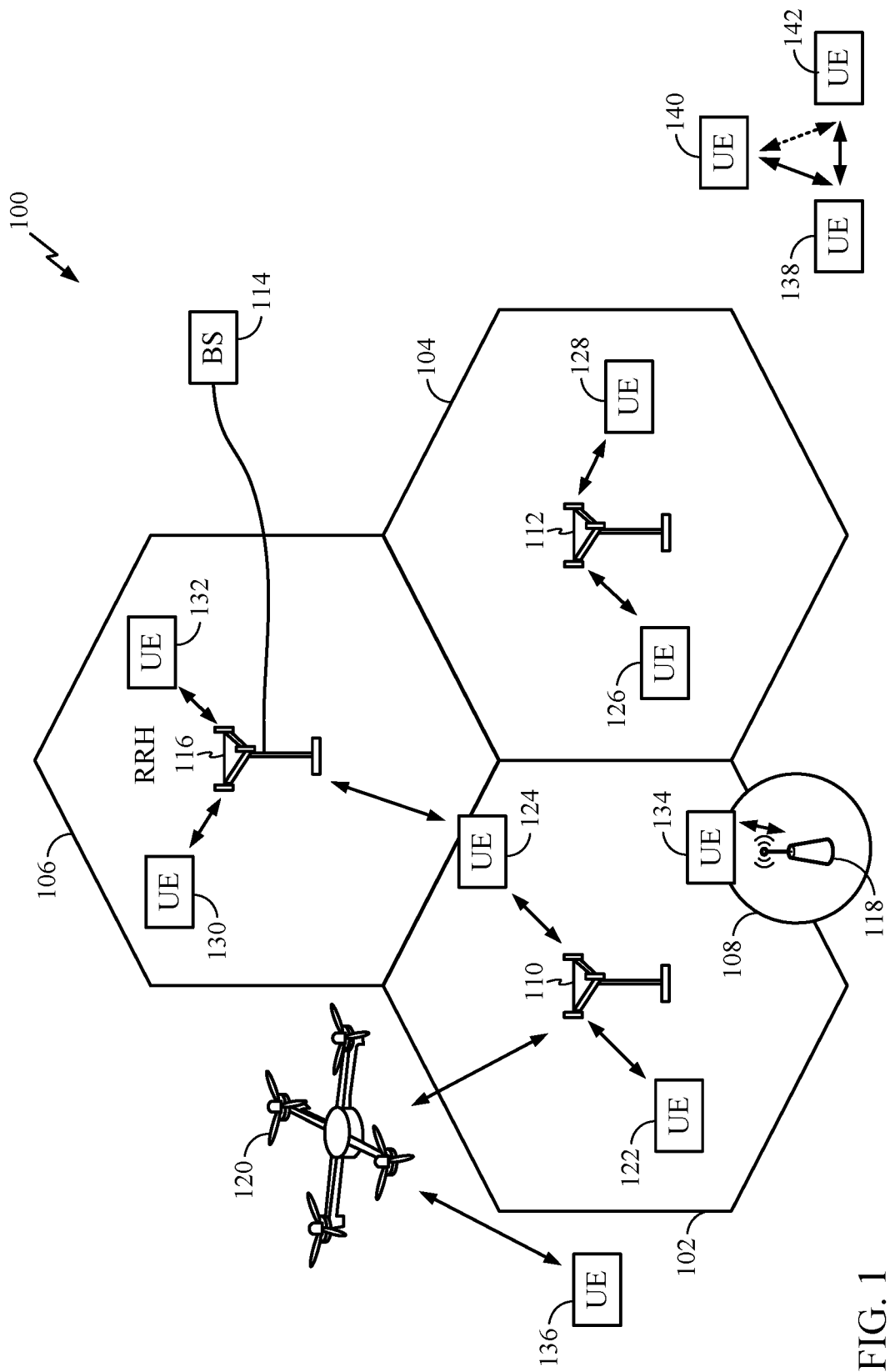
FIG. 1 is a diagram illustrating an example of an access network according to some aspects of the present disclosure.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120. In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., abase station) allocates resources for communication among some or all devices and equipment within its service area or cell. In certain aspects, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity 138.

Figure 2:
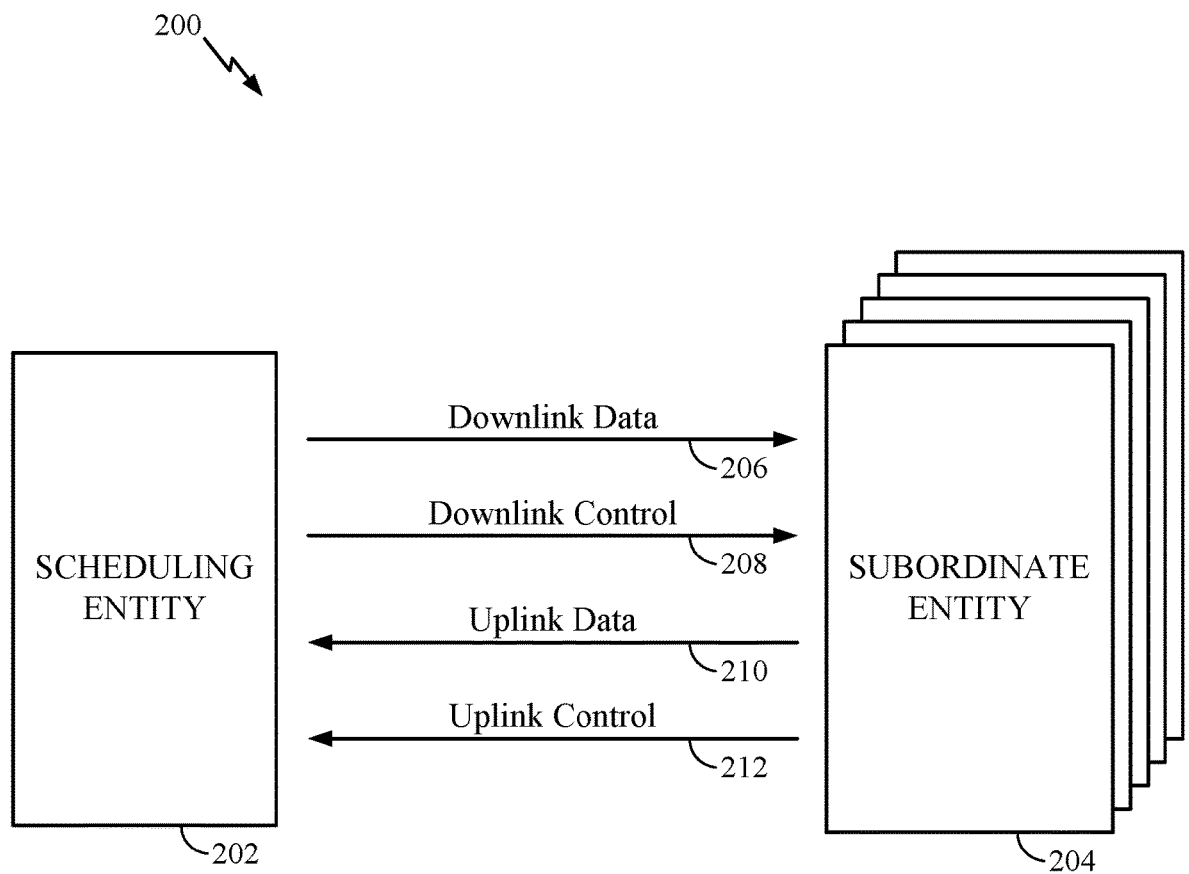
FIG. 2 is a diagram conceptually illustrating an example of a scheduling entity communicating with one or more subordinate entities according to some aspects of the present disclosure.

Thus, in a wireless communication network with a scheduled access to time-frequency resources and having a cellular configuration, a P2P configuration, and a mesh configuration, a scheduling entity and one or more subordinate entities may communicate utilizing the scheduled resources. Referring now to FIG. 2, a block diagram 200 illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast downlink data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

Furthermore, the subordinate entities 204 may transmit uplink control information 212 to the scheduling entity 202. Uplink control information (UCI) may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc. The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

Figure 3:
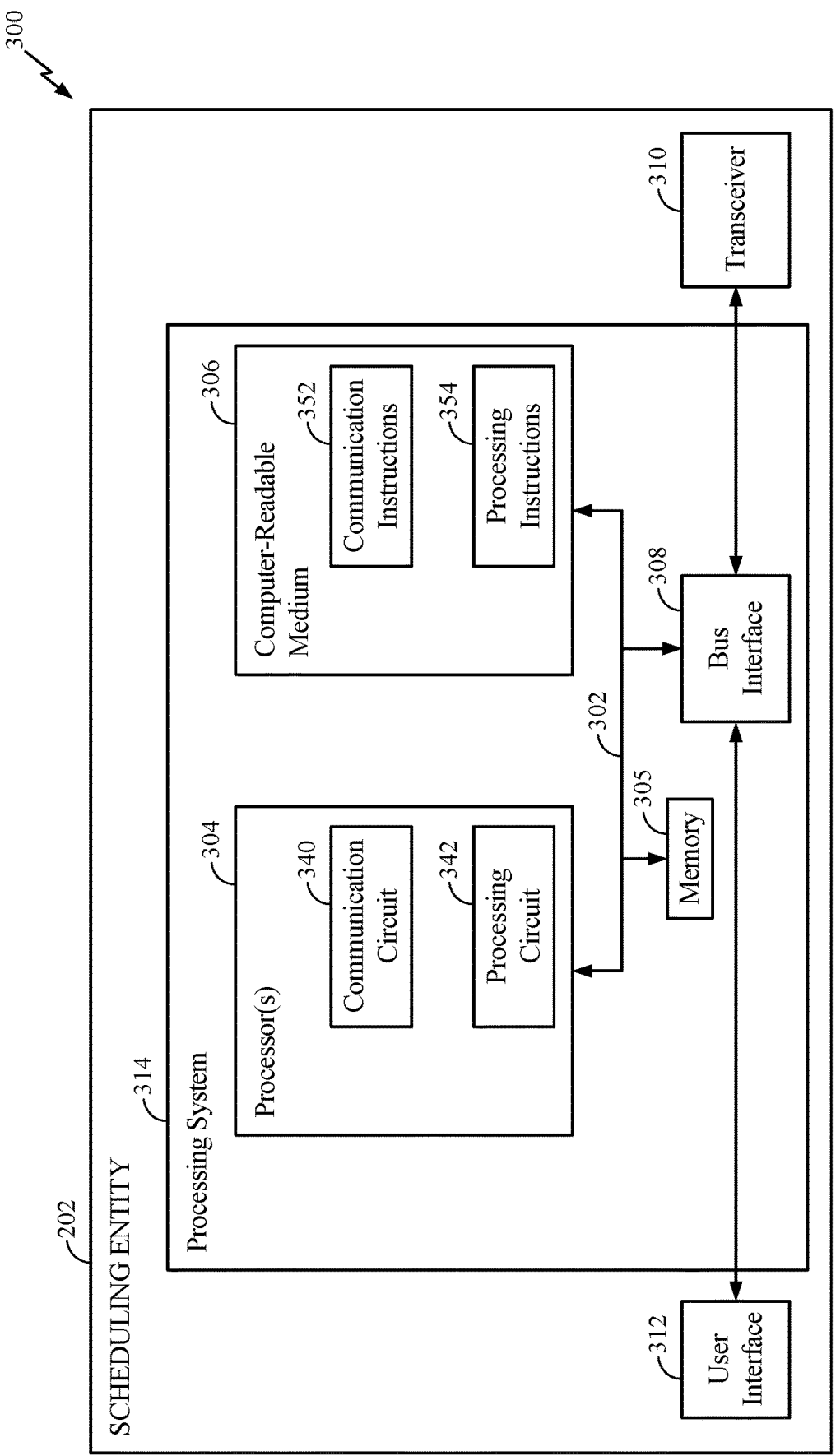
FIG. 3 is a diagram illustrating an example of a hardware implementation for a scheduling entity according to some aspects of the present disclosure.

FIG. 3 is a diagram 300 illustrating an example of a hardware implementation for scheduling entity 202 according to aspects of the present disclosure. Scheduling entity 202 may employ a processing system 314. Scheduling entity 202 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, scheduling entity 202 may be configured to perform any one or more of the functions described herein. That is, the processor 304, as utilized in scheduling entity 202, may be used to implement any one or more of the processes described herein.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

At least one processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software. In some aspects of the disclosure, the computer-readable medium 306 may include communication instructions 352. The communication instructions 352 may include instructions for performing various operations related to wireless communication (e.g., signal reception and/or signal transmission) as described herein. In some aspects of the disclosure, the computer-readable medium 306 may include processing instructions 354. The processing instructions 354 may include instructions for performing various operations related to signal processing (e.g., processing a received signal and/or processing a signal for transmission) as described herein.

At least one processor 304 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 304 may include a communication circuit 340. The communication circuit 340 may include one or more hardware components that provide the physical structure that performs various processes related to wireless communication (e.g., signal reception and/or signal transmission) as described herein. In some aspects of the disclosure, the processor 304 may also include a processing circuit 342. The processing circuit 342 may include one or more hardware components that provide the physical structure that performs various processes related to signal processing (e.g., processing a received signal and/or processing a signal for transmission) as described herein. The circuitry included in the processor 304 is provided as non-limiting examples. Other means for carrying out the described functions exists and is included within various aspects of the present disclosure. In some aspects of the disclosure, the computer-readable medium 306 may store computer-executable code comprising instructions configured to perform various processes described herein. The instructions included in the computer-readable medium 306 are provided as non-limiting examples. Other instructions configured to carry out the described functions exist and are included within various aspects of the present disclosure.

Figure 4:
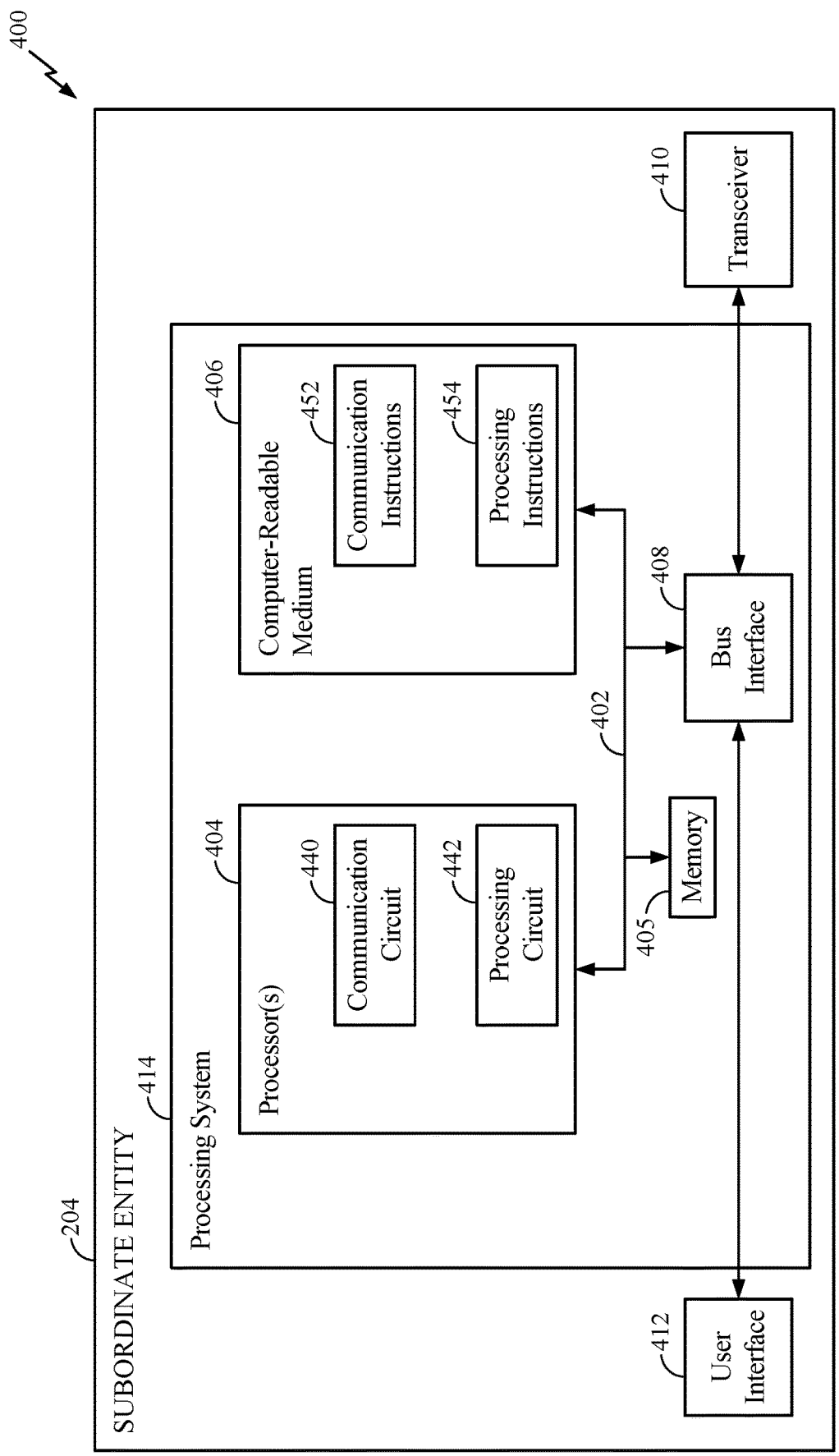
FIG. 4 is a diagram illustrating an example of a hardware implementation for a subordinate entity according to some aspects of the present disclosure.

FIG. 4 is a diagram 400 illustrating an example of a hardware implementation for subordinate entity 204 according to aspects of the present disclosure. Subordinate entity 204 may employ a processing system 414. Subordinate entity 204 may be implemented with a processing system 414 that includes one or more processors 404. Examples of processors 404 include microprocessors, microcontrollers, DSPs, FPGAs, PLDs, state machines, gated logic, discrete hardware circuits, and other suitable hardware configured to perform the various functionality described throughout this disclosure. In various examples, subordinate entity 204 may be configured to perform any one or more of the functions described herein. That is, the processor 404, as utilized in subordinate entity 204, may be used to implement any one or more of the processes described herein.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

At least one processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software. In some aspects of the disclosure, the computer-readable medium 406 may include communication instructions 452. The communication instructions 452 may include instructions for performing various operations related to wireless communication (e.g., signal reception and/or signal transmission) as described herein. In some aspects of the disclosure, the computer-readable medium 406 may include processing instructions 454. The processing instructions 454 may include instructions for performing various operations related to signal processing (e.g., processing a received signal and/or processing a signal for transmission) as described herein.

At least one processor 404 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 404 may include a communication circuit 440. The communication circuit 440 may include one or more hardware components that provide the physical structure that performs various processes related to wireless communication (e.g., signal reception and/or signal transmission) as described herein. In some aspects of the disclosure, the processor 404 may also include a processing circuit 442. The processing circuit 442 may include one or more hardware components that provide the physical structure that performs various processes related to signal processing (e.g., processing a received signal and/or processing a signal for transmission) as described herein. The circuitry included in the processor 404 is provided as non-limiting examples. Other means for carrying out the described functions exists and is included within various aspects of the present disclosure. In some aspects of the disclosure, the computer-readable medium 406 may store computer-executable code comprising instructions configured to perform various processes described herein. The instructions included in the computer-readable medium 406 are provided as non-limiting examples. Other instructions configured to carry out the described functions exist and are included within various aspects of the present disclosure.

Figure 5:
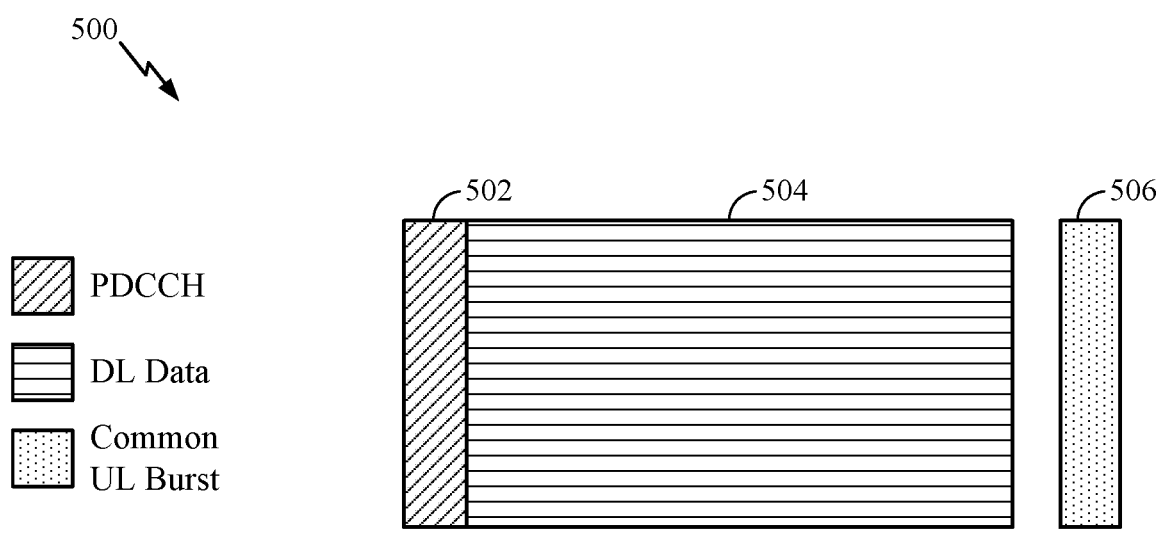
FIG. 5 is a diagram illustrating an example of a downlink (DL)-centric subframe according to some aspects of the present disclosure.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity 202 (e.g., eNB) to the subordinate entity 204 (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information. As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity 204 (e.g., UE)) to UL communication (e.g., transmission by the subordinate entity 204 (e.g., UE)). One of ordinary skill in the art will understand that the foregoing is merely one example of a DL-centric subframe and alternative structures having similar features may exist without necessarily deviating from the aspects described herein.

Figure 6:
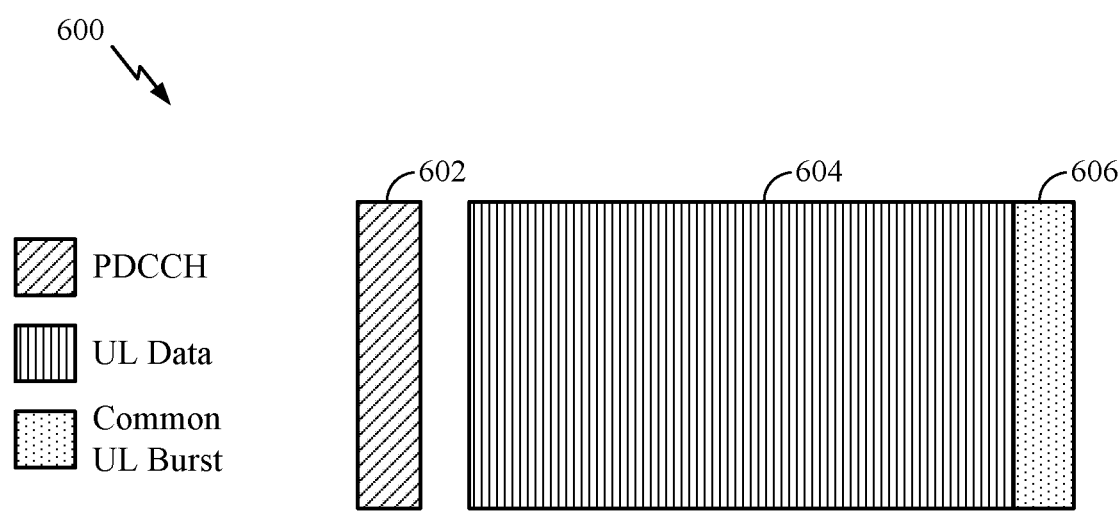
FIG. 6 is a diagram illustrating an example of an uplink (UL)-centric subframe according to some aspects of the present disclosure.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the payload of the UL-centric subframe. In some aspects, the UL data portion 604 may also be referred to as a UL regular portion 604. In particular, the UL regular portion 604, in some aspects, may not be limited to including data, and may include other information such as control information, a sounding reference signal (SRS), etc. The UL portion may refer to the communication resources utilized to communicate UL data from the subordinate entity 204 (e.g., UE) to the scheduling entity 202 (e.g., eNB). In some configurations, the control portion 602 may be a physical UL shared channel (PUSCH), physical UL control channel (PUCCH), and/or include a sounding reference signal (SRS). As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity 202 (e.g., UE)) to UL communication (e.g., transmission by the scheduling entity 202 (e.g., UE)). The UL-centric subframe may also include a common UL portion 606. The common UL portion 606 in FIG. 6 may be similar to the common UL portion 506 described above with reference to FIG. 5. The common UL portion 506 may include additional or alternative information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

According to aspects of the present disclosure, techniques are provided to include uplink control information in frames and transmit the frames including the uplink control information. For example, a UE may transmit UCI in a TTI (e.g., subframe) to an eNB on a UL channel. In certain aspects, uplink control information (e.g., the payload of UCI) may include one or more of a scheduling request (SR), an acknowledgement message (ACK) (and/or similarly a negative acknowledgement message (NACK)), and a channel quality indicator (CQI). It should be noted that when ACKs are discussed herein, similar techniques may apply to including NACKs in the UCI.

In some aspects, UCI may be sent on the UL in a UL-centric subframe, such as the UL-centric subframe of FIG. 6. For example, the UCI may be sent in an UL regular portion (e.g., UL regular portion 604) and/or a common UL portion (e.g., common UL portion 606) of the UL-centric subframe. Additionally or alternatively, the UCI may be sent on the UL in a common UL portion of a DL-centric subframe (e.g., common UL portion 506). Transmission of data (e.g., the UCI) on the UL regular portion of the UL-centric subframe may be referred to as UL regular burst communication. Transmission of data (e.g., the UCI) on the common UL portion of the UL-centric subframe and/or the DL-centric subframe may be referred to as UL common burst communication.

UE Processing Time for UCI Multiplexing

Aspects of the present disclosure provide proposals for UE processing timing for uplink control information (UCI) transmissions. In some cases, such UCI transmissions may include channel state feedback (CSF) reports, ACK/NACK bits, and/or other types of information or data.

As will be described in greater detail below, in some cases, timing conditions may be relaxed to allow a UE to multiplex certain information (e.g., ACK/NACK, CSF, and/or data) in an uplink transmission. The relaxation may be relative to a baseline timing condition, for example, of when control information only is to be transmitted. In some cases, a UE may evaluate timing conditions for various types of requests and decide to multiplex requested information only if all timing conditions are met. In the event one of the conditions is not met, the UE may decide which information to transmit and which to drop (e.g., based on some type of prioritization rules).

In NR, certain specification rules may be provided for a UE to handle requests for ACK/NAK and CSF reporting within a certain processing time. The rules may be designed, for example, to be sure a UE with a given processing capability has sufficient time to process the request. This processing may include processing a PDSCH transmission in order to provide requested ACK/NACK feedback, measuring CSI-RS transmissions to generate CSF, and processing/generating uplink data in response to an uplink grant. This use of rules allows the UE processing time to be well-defined for the network to signal to reduce latency efficiently when reporting requests.

In certain deployments, such as NR, UE processing time(s) may be defined in terms of symbols (N1, N2) and/or in terms of absolute time (e.g., in us), instead of slots (e.g., K1 and K2 slot-level values corresponding to N1 and N2), where:

N1: the number of OFDM symbols required for UE processing from the end of PDSCH reception to the earliest possible start of the corresponding ACK/NACK transmission from UE perspective N2: the number of OFDM symbols required for UE processing from the end of PDCCH containing the UL grant reception to the earliest possible start of the corresponding PUSCH transmission from UE perspective In some cases, timing advance (TA) may not be included in N1 and N2. It may be decided whether to include other aspects, such as UE UL/DL switching time, in N1 and N2. The UE may not be expected transmit anything in uplink if the network set the values of N1 and/or N2 (K1 and/or K2) without leaving sufficient time for UE processing. In other words, the UE may not have sufficient processing time to generate valid values for the requested information. Various factors may effect UE processing time.

FIG. 7 illustrates example UE processing time dependency factors according to some aspects of the present disclosure. For a set of operation conditions, two minimum (K1, K2) values representing two different UE capabilities may be supported at least for slot-based scheduling.

The set of operation conditions at least include the contents and the notes of Table shown in FIG. 7 and the 1st column (DMRS, RE mapping for PUSCH) and the 1st row (SCS) of the Tables shown in FIGS. 7A and 7B. Each of the minimum (K1, K2) may be based on assumptions of a respective UE turn-around times (N1, N2). For a given configuration and numerology (e.g., subcarrier spacing and/or CP length), a UE may indicate only one capability for N1 and N2 based on corresponding entry for N1 and N2 from either Table. In some cases, multiple UE capabilities may be reported, for example, with different throughput constraints. In some cases, a UE may signal information indicating its processing capability based on (N1, N2) or (K1, K2).

The table of FIG. 7A includes values that may be considered baseline UE processing time capability (e.g., in NR Release 15) at least for slot-based scheduling in the non-CA case with single numerology for PDCCH, PDSCH, and PUSCH. The table of FIG. 7B, on the other hand, includes values that may be considered an aggressive UE processing time capability, at least for slot-based scheduling in the non-CA case with single numerology for PDCCH, PDSCH, and PUSCH.

Figure 8:
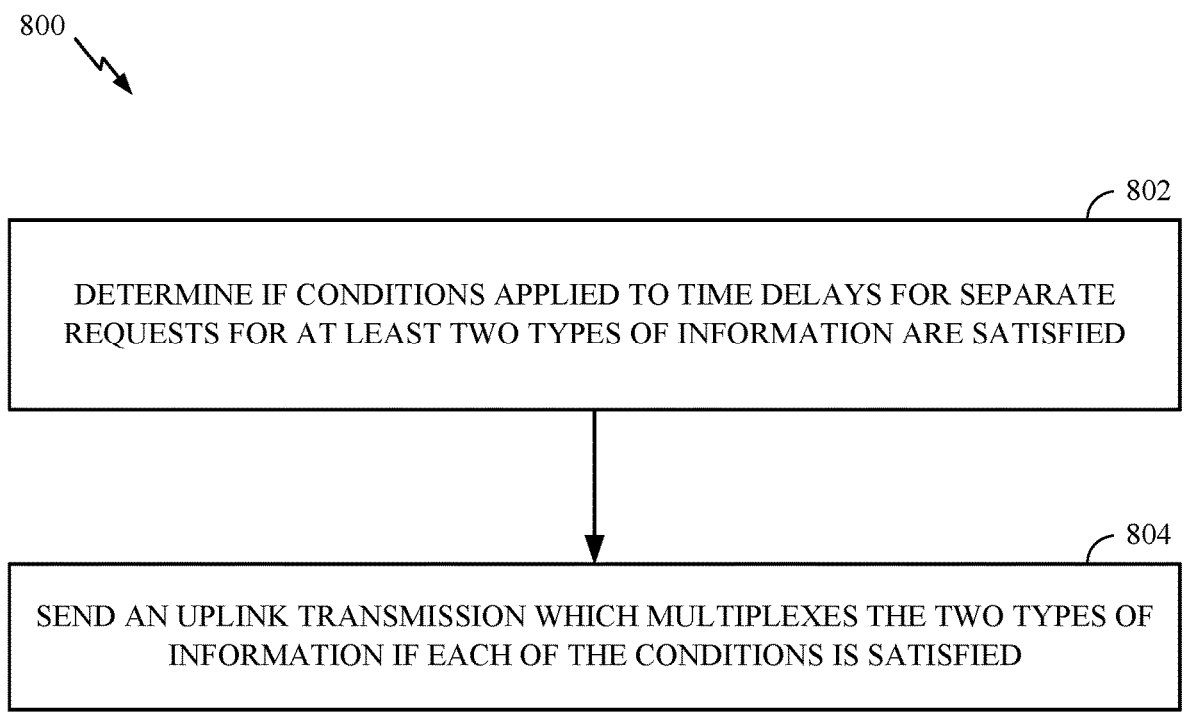
FIG. 8 illustrates example operations for processing UCI, according to aspects of the present disclosure.

FIG. 8 illustrates example operations 800 that may be performed by a UE to process UCI, according to aspects of the present disclosure. Operations 800 may be performed, for example, by a UE configured as the subordinating entity of FIG. 4 to process UCI based on requests from a base station configured as the scheduling entity of FIG. 3.

Operations 800 begin, at 802, by determining if conditions applied to time delays for separate requests for at least two types of information are satisfied. At 804, the UE sends an uplink transmission which multiplexes the two types of information if each of the conditions is satisfied.

In some cases, multiplexing multiple types of information may lead to efficient use of resources, depending on scheduling and allocated resources. For example, in some cases, a UE may be scheduled with resources for a PUCCH transmission that overlap with resources allocated for another PUCCH and/or PUSCH transmission. In such cases, the corresponding information (UCI, CSF, and/or data) may be efficiently multiplexed in a single (PUCCH or PUSCH) transmission. In some cases, however, in order to multiplex different types of information in a single uplink transmissions and still meet the timing conditions of each individual information request (N1, N2, and/or N3), one or more of these conditions may need to be relaxed. In some cases, the particular timing conditions may be dependent, at least in part, on UE capability and/or other factors, such as subcarrier spacing (e.g., of a downlink carrying scheduling information or of an uplink carrying the requested information).

FIGS. 9-12 illustrate example processing times for UCI and CSF reporting according to some aspects of the present disclosure. For example, FIGS. 9-12 illustrate various conditions that may be considered by a UE performing operations 800 described above. As noted above, some of the processing timelines may be considered relaxed relative to a baseline condition of a processing timeline for reporting control information only.

Certain aspects of the present disclosure provide a proposal for UE processing of CSF to be reported on PUCCH. In some cases, a timing parameter N3 may be characterized and used for UE processing timing. For example, CQI reporting processing time may be defined in terms of symbols N3 instead of slots Y.

Figure 9:
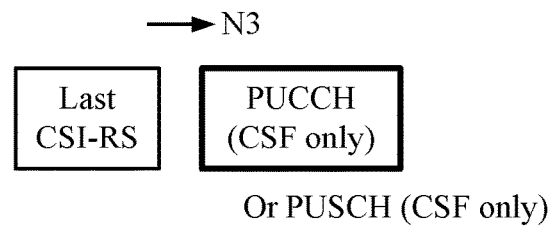
FIGS. 9-12 illustrate example processing times for UCI and CSF reporting according to some aspects of the present disclosure.

As illustrated in FIG. 9, N3 may be defined as the duration (in symbols) from a symbol carrying a last CSI-RS to be measured to a first symbol of a PUCCH containing the report (CSF). This same timing may also correspond to UCI carried on a PUSCH (e.g., when there is no data scheduled). In some cases, the value of N3 may be a UE capability per subcarrier spacing (SCS). In such cases, there may be no need for explicit table in a standard. N3 may not include TA and, this may the processing requirement for the UE clearer. There may also be no need to put a limit on TA. In some cases, however, a UE may not send the report if the sum of the TA value and N3 (TA+N3) exceeds a certain time (e.g., allotted by a gNB). In some cases a UE may apply N3 to CSI-RS and PUCCH/PUSCH in mini-slots.

Figure 10:
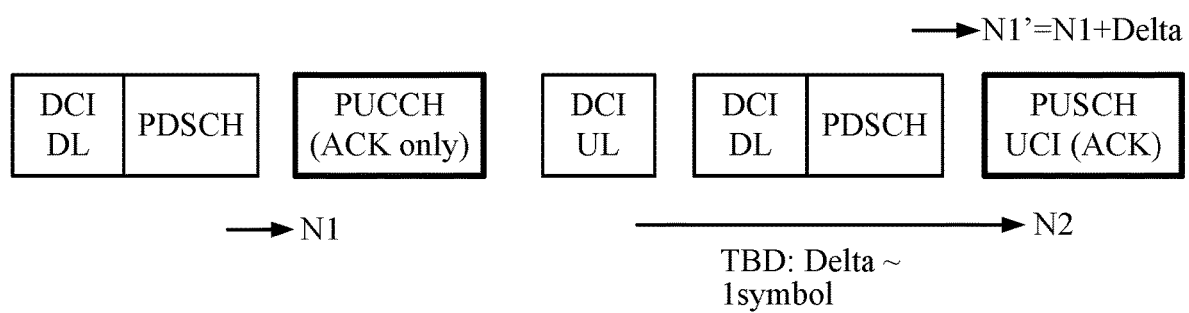

As illustrated in FIG. 10, in some cases, a parameter N1' may be used for processing time when multiplexing ACK and UL Data together in a single PUSCH transmission. N1' may be considered a relaxed version of N1, with a corresponding longer delay than a conventional N1 shown for the baseline case of PUCCH with ACK only. As illustrated, in FIG. 10, PUSCH may piggyback ACK and Data only if both the N2 and N1' timing conditions are satisfied. Otherwise, the UE may send ACK information only (e.g., a NAK).

Figure 11:
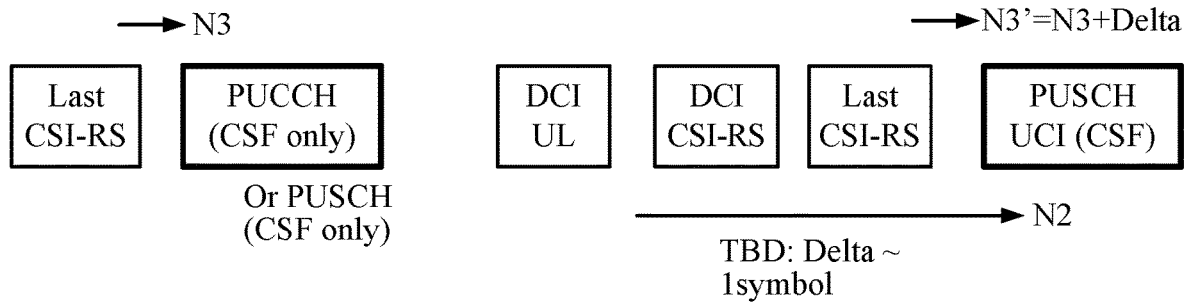

As illustrated in FIG. 11, in a similar manner to N1', a relaxed version of parameter N3' may be used for UE processing time when multiplexing CSF and UL Data in a single PUSCH. As illustrated in FIG. 11, PUSCH may be used to piggyback CSF with UL data if timing conditions for both N2 and N3' are satisfied. Otherwise, the UE may choose to ignore sending (drop) CSF in the granted PUSCH transmission and send data only.

Figure 12:
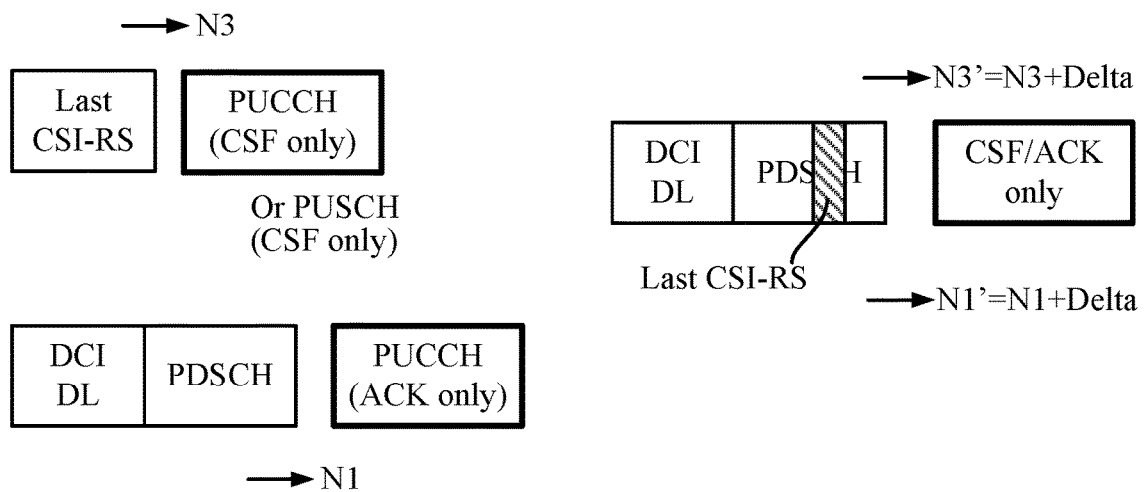

As illustrated in FIG. 12, in some cases, both parameters N1' and N3' may be used for UE processing time when multiplexing both CSF and ACK information. As illustrated in FIG. 12, PUCCH can be used to multiplex CSF and ACK information if both N1' and N3' timing conditions are satisfied. Otherwise, the UE can ignore sending one either ACK or CSF, for example, according to prioritization. For data multiplexing, if UL data is also included in the same transmission, the UE may further need to make sure N2 is satisfied (e.g., such that data is prioritized above others).

There are many possible techniques for conveying prioritization rules a UE may apply to determine what types of information to send (and drop) when one of the timing conditions is not satisfied. For example, the UE may be instructed by specification (e.g., by a standards organization) to follow and provide information for the first request made. Alternatively, the UE may be allowed to drop both requests if they are made in conflict (such as one or both timing conditions are not satisfied). As still another alternative, the UE may decide how to handle such conflicts and the gNB may be required to blindly decode to determine what information the UE decided to send.

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Several aspects of a wireless communication network have been presented with reference to an exemplary implementation. As those skilled in the art will readily appreciate, various aspects described throughout this disclosure may be extended to other telecommunication systems, network architectures and communication standards. By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware. For example, various operations shown in FIG. 8 may be performed by various processors shown in FIG. 3 or 4.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for wireless communications by a user equipment (UE), comprising:
   determining, using at least a first processing time parameter associated with processing a first request for a first type of information and a second processing time parameter associated with processing a second request for a second type of information, whether a first timing condition associated with processing the first request for the first type of information is satisfied and whether a second timing condition associated with processing the second request for the second type of information is satisfied;
   multiplexing the first type of information and the second type of information when, based on the determination, the first timing condition and the second timing condition are each satisfied; and
   sending an uplink transmission including the multiplexed first type of information and the second type of information when, based on the determination, the first timing condition and the second timing condition are each satisfied.

2. The method of claim 1, wherein at least one of the first timing condition or the second timing condition represents a condition with a greater time delay, relative to a baseline time delay if only one of the first type of information or the second type of information was requested.

3. The method of claim 2, wherein the condition comprises one or more additional symbols added to the first timing condition, the second timing condition, or both.

4. The method of claim 1, wherein the first type of information and the second type of information each comprises at least one of uplink data and control information.

5. The method of claim 4, wherein the control information comprises acknowledgment information, channel state feedback (CSF), or both.

6. The method of claim 5, wherein one of the first timing condition or the second timing condition comprises:
   a first number of orthogonal frequency division multiplexed (OFDM) symbols for UE processing from an end of a physical downlink shared channel (PDSCH) reception to a first symbol of an uplink transmission containing the acknowledgment information.

7. The method of claim 6, wherein the other one of the first timing condition or the second timing condition comprises:
   a third number of OFDM symbols from an end of a physical downlink control channel (PDCCH) reception scheduling the uplink data on a physical uplink shared channel (PUSCH) to a first symbol of the PUSCH.

8. The method of claim 5, wherein one of the first timing condition or the second timing condition comprises:
   a second number of orthogonal frequency division multiplexed (OFDM) symbols from a last channel state information reference signal (CSI-RS) symbol to a first symbol of an uplink transmission containing the CSF.

9. The method of claim 8, wherein the other one of the first timing condition or the second timing condition comprises:
   a fourth number of OFDM symbols from an end of a physical downlink control channel (PDCCH) reception scheduling the uplink data on a physical uplink shared channel (PUSCH) to a first symbol of the PUSCH.

10. The method of claim 5, wherein:
    the control information comprises the acknowledgment information; and
    sending the uplink transmission comprises sending the uplink transmission with only the acknowledgement information and not the uplink data when, based on the determination, at least one of the first timing condition or the second timing condition is not satisfied.

11. The method of claim 5, wherein:
the control information comprises the CSF; and
sending the uplink transmission comprises sending the uplink transmission with only the uplink data and not the CSF if at least one of the first timing condition or the second timing condition is not satisfied.

12. The method of claim 1, wherein the first type of information and the second type of information comprise acknowledgment information and channel state feedback (CSF), respectively.

13. The method of claim 12, wherein multiplexing the first type of information and the second type of information comprises multiplexing the first type of information and the second type of information with uplink data.

14. The method of claim 1, further comprising applying one or more prioritization rules to select which of the first and second types of information to send in the uplink transmission when, based on the determination, at least one of the first timing condition or the second timing condition is not satisfied.

15. The method of claim 14, wherein at least one of a UE configuration, a network configuration, or a standard specification dictates the prioritization rules.

16. An apparatus for wireless communications by a user equipment (UE), comprising:
means for determining, using at least a first processing time parameter associated with processing a first request for a first type of information and a second processing time parameter associated with processing a second request for a second type of information, whether a first timing condition associated with processing the first request for the first type of information is satisfied and whether a second timing condition associated with processing the second request for the second type of information is satisfied;
means for multiplexing the first type of information and the second type of information when, based on the determination, the first timing condition and the second timing condition are each satisfied; and
means for sending an uplink transmission including the multiplexed first type of information and the second type of information when, based on the determination, the first timing condition and the second timing condition are each satisfied.

17. The apparatus of claim 16, wherein at least one of the first timing condition or the second timing condition represents a condition with a greater time delay, relative to a baseline time delay if only one of the first type of information or the second type of information was requested.

18. The apparatus of claim 16, wherein the first type of information and the second type of information each comprises at least one of uplink data and control information.

19. The apparatus of claim 18, wherein the control information comprises acknowledgment information, channel state feedback (CSF), or both.

20. The apparatus of claim 19, wherein one of the first timing condition or the second timing condition comprises:
a first number of orthogonal frequency division multiplexed (OFDM) symbols for UE processing from an end of a physical downlink shared channel (PDSCH) reception to a first symbol of an uplink transmission containing the acknowledgment information.

21. The apparatus of claim 19, wherein one of the first timing condition or the second timing condition comprises:
a second number of orthogonal frequency division multiplexed (OFDM) symbols from a last channel state information reference signal (CSI-RS) symbol to a first symbol of an uplink transmission containing the CSF.

22. The apparatus of claim 19, wherein:
the control information comprises the acknowledgment information; and
the means for sending the uplink transmission comprise means for sending the uplink transmission with only the acknowledgement information and not the uplink data when, based on the determination, at least one of the first timing condition or the second timing condition is not satisfied.

23. The apparatus of claim 19, wherein:
the control information comprises channel state feedback (CSF); and
the means for sending the uplink transmission comprise means for sending the uplink transmission with only the uplink data and not the CSF when, based on the determination, at least one of the first timing condition or the second timing condition is not satisfied.

24. The apparatus of claim 16, wherein the first type of information and the second type of information comprise acknowledgment information and channel state feedback (CSF), respectively.

25. The apparatus of claim 24, wherein the means for multiplexing the first type of information and the second type of information comprise means for multiplexing the first type of information and the second type of information with uplink data.

26. The apparatus of claim 16, further comprising means for applying one or more prioritization rules to select which of the first and second types of information to transmit when, based on the determination, at least one of the first timing condition or the second timing condition is not satisfied.

27. The apparatus of claim 26, wherein at least one of a UE configuration, a network configuration, or a standard specification dictates the prioritization rules.

28. An apparatus for wireless communications by a user equipment (UE), comprising:
at least one processor configured to:
determine, using at least a first processing time parameter associated with processing a first request for a first type of information and a second processing time parameter associated with processing a second request for a second type of information, whether a first timing condition associated with processing the first request for the first type of information is satisfied and whether a second timing condition associated with processing the second request for the second type of information is satisfied; and
multiplex the first type of information and the second type of information when, based on the determination, each of the first timing condition or the second timing condition is satisfied; and
a transmitter configured to send an uplink transmission including the multiplexed first type of information and the second type of information when, based on the determination, each of the first timing condition or the second timing condition is satisfied.

29. A non-transitory computer readable medium having instructions stored thereon for:
determining, using at least a first processing time parameter associated with processing a first request for a first type of information and a second processing time parameter associated with processing a second request for a second type of information, whether a first timing condition associated with processing the first request for the first type of information is satisfied and whether a second timing condition associated with processing the second request for the second type of information is satisfied; and multiplexing the first type of information and the second type of information when, based on the determination, each of the first timing condition or the second timing condition is satisfied; and sending an uplink transmission including the multiplexed first type of information and the second type of information when, based on the determination, each of the first timing condition or the second timing condition is satisfied.

\* \* \* \* \*